United States Patent
Vargantwar et al.

(10) Patent No.: US 8,416,750 B1
(45) Date of Patent: Apr. 9, 2013

(54) SELECTIVE SCHEDULING OF CONTROL CHANNEL MESSAGES AHEAD OF BEST-EFFORT TRAFFIC

(75) Inventors: Sachin R. Vargantwar, Overland Park, KS (US); Maulik Shah, Overland Park, KS (US); Deveshkumar Rai, Overland Park, KS (US); Debasish Sarkar, Irvine, CA (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 852 days.

(21) Appl. No.: 12/420,635

(22) Filed: Apr. 8, 2009

(51) Int. Cl.
*H04J 3/00* (2006.01)

(52) U.S. Cl.
USPC ........... 370/337; 370/329; 370/345; 370/436; 370/458; 455/452.1; 455/455

(58) Field of Classification Search .................. None
See application file for complete search history.

(56) References Cited

U.S. PATENT DOCUMENTS

| | | | | |
|---|---|---|---|---|
| 5,278,831 A * | 1/1994 | Mabey et al. | ................. | 370/349 |
| 5,778,318 A * | 7/1998 | Talarmo et al. | ............ | 455/452.1 |
| 6,819,652 B1 * | 11/2004 | Akhtar et al. | ................. | 370/230 |
| 6,959,151 B1 * | 10/2005 | Cotter et al. | .................... | 398/54 |
| 7,353,001 B1 * | 4/2008 | Ngan | ........................... | 455/63.4 |
| 2009/0176513 A1 * | 7/2009 | Bosch et al. | ................. | 455/458 |
| 2010/0039933 A1 * | 2/2010 | Taylor et al. | ................. | 370/217 |

* cited by examiner

*Primary Examiner* — Jason Mattis
*Assistant Examiner* — James P Duffy (57) ABSTRACT

A method and system is disclosed for selectively scheduling control channel messages ahead of traffic channel data. When a RAN in a wireless communication system operating at least according to IS-856 determines that a delay condition exists in the transmission of a particular control packet to access terminals, the RAN will determine if there is a particular traffic packet in active transmission that is classified according to best effort service (or similarly-characterized service class), and further if at least a threshold number of a nominal number of time-slot segments of the particular traffic packet remain untransmitted. If such a traffic packet is identified, the RAN will cancel transmission of the particular traffic packet and replace it with immediate transmission of the particular control packet.

24 Claims, 4 Drawing Sheets

SELECTIVE SCHEDULING OF CONTROL CHANNEL MESSAGES AHEAD OF BEST-EFFORT TRAFFIC

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

Overview

Access terminals operating in a wireless communication system receive user data from a RAN on one or more "traffic channels," and receive control messages from a RAN on one or more "control channels." In accordance with some wireless interface protocols, for example under IS-856, the control channels and traffic channels are time division multiplexed together on common "forward" channels from the RAN to access terminals operating in a coverage area serviced by the RAN. Both traffic-channel data and control-channel data are assembled into packets, which are then subdivided and encoded into segments that are in turn scheduled for transmission in time slots of the forward channel. Time slots bearing traffic-channel data and time slots bearing control channel data are interlaced with one another on the forward channel to achieve time-division-multiplexed transmission.

While the time-slot scheduling of traffic-channel data and control-channel data is typically arranged to achieve high system throughput as well as low latency transmission, delay in transmission of control message may still occur. In practice, control messages are either transmitted synchronously in predetermined time slots, or are transmitted asynchronously only as appropriate time slots become available. It may happen from time to time that one or more asynchronous control packets that are carrying time-sensitive information are subject to unacceptable or problematic delay in transmission. Accordingly, embodiments of the present invention provide a method and system for selective scheduling of control packets that reduces transmission delay of asynchronous control messages by reallocating time slots from certain traffic packets to control packets carrying asynchronous control messages. More specifically, when a RAN determines that unacceptable or problematic delay exists for a particular asynchronous control packet, the RAN identifies a particular traffic packet for which traffic-channel time slots have already been allocated, and for which at least a threshold number of traffic-channel time slots remain as yet untransmitted, and reallocates those traffic-channel time slots for use as control-channel time slots for transmission of the particular asynchronous control packet. Advantageously, this approach reduces delay in transmission of time-sensitive asynchronous control messages.

Hence, in one respect, various embodiments of the present invention provide, in a wireless communication system that includes a Radio Access Network (RAN), a method of transmitting control messages to access terminals, the method being carried out by the RAN and comprising: on a radio frequency interface, using time-division multiplexing to transmit control packets and traffic packets to access terminals, each control packet being transmitted in its entirety over the course of one or more regularly-space control-channel time slots, and each traffic packet being transmitted in its entirety over the course of one or more regularly-space traffic-channel time slots, wherein control-channel time slots and traffic-channel time slots are interlaced; making a determination that a particular control packet to be scheduled for transmission is subject to a delay condition; in response to the determination, identifying a particular traffic packet for which a first total number of traffic-channel time slots have been allocated for transmission of the particular traffic packet, and for which at least a threshold number of the first total number of traffic-channel time slots allocated for transmission of the particular traffic packet remain untransmitted; and reallocating up to the threshold number of the remaining, untransmitted traffic-channel time slots of the particular traffic packet for use as control-channel time slots to transmit the particular control packet.

In another respect, various embodiments of the present invention provide, in a wireless communication system that includes a Radio Access Network (RAN), a method of transmitting control messages to access terminals, the method being carried out by the RAN and comprising: on a radio frequency interface, using time-division multiplexing to transmit control packets and traffic packets to access terminals, each control packet being transmitted in its entirety over the course of one or more regularly-space control-channel time slots, and each traffic packet being transmitted in its entirety over the course of one or more regularly-space traffic-channel time slots, wherein control-channel time slots and traffic-channel time slots are interlaced; making a determination that a particular control packet that is subject to a delay condition cannot be scheduled for transmission earlier than completion of an in-progress transmission of a particular traffic packet, wherein a first total number of traffic-channel time slots have been allocated for transmission of the particular traffic packet; determining that at least a threshold number of the first total number of traffic-channel time slots allocated for the particular traffic packet remain untransmitted; suspending transmission of the particular traffic packet prior to transmitting any of the remaining, untransmitted traffic-channel time slots of the particular traffic packet; and reallocating up to the threshold number of the remaining, untransmitted traffic-channel time slots of the particular traffic packet for use as control-channel time slots to transmit the particular control packet.

In still another respect, various embodiments of the present invention provide, in a wireless communication system that includes a Radio Access Network (RAN), a method of transmitting control messages to access terminals, an improvement comprising: means for, on a radio frequency interface, using time-division multiplexing to transmit control packets and traffic packets to access terminals, wherein each control packet is transmitted in its entirety over the course of one or more regularly-space control-channel time slots, and each traffic packet is transmitted in its entirety over the course of one or more regularly-space traffic-channel time slots, and wherein control-channel time slots and traffic-channel time slots are interlaced; means for making a determination that a particular control packet that is subject to a delay condition cannot be scheduled for transmission earlier than completion of an in-progress transmission of a particular traffic packet, wherein a first total number of traffic-channel time slots have been allocated for transmission of the particular traffic packet; means for determining that at least a threshold number of a first total number of traffic-channel time slots allocated for the particular traffic packet remain untransmitted; means for suspending transmission of the particular traffic packet prior to transmitting any of the remaining, untransmitted traffic-channel time slots of the particular traffic packet; and means for reallocating up to the threshold number of the remaining, untransmitted traffic-channel time slots of the particular traffic packet for use as control-channel time slots to transmit the particular control packet.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
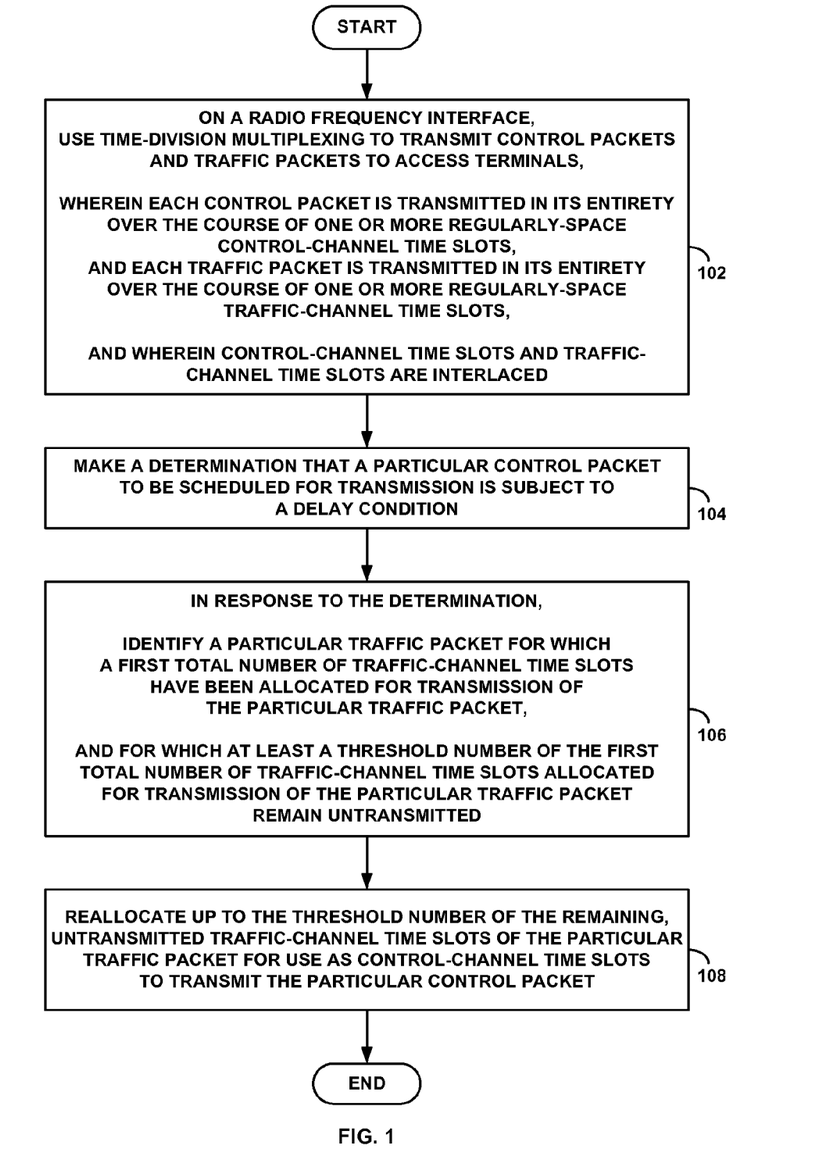
FIG. 1 is a flowchart depicting an example embodiment of selective scheduling of control packets.

FIG. 1 is a flowchart depicting an example embodiment of selective scheduling of control packets. By way of example, the steps of the flowchart could be implemented in a wireless communication system that operates according to a CDMA family of protocols, and in particular IS-856. More particularly, the steps could be carried out by one or more RANs (or elements of a RAN) of the wireless communication system.

At step 102 time-division multiplexing is used to transmit control packets and traffic packets to access terminals. Each control packet and each traffic packet is transmitted over the course of one or more regularly-spaced time slots, and time slots bearing control packets are interlaced with time slots bearing traffic packets. Control packets comprise partial, whole, or multiple control messages. Control messages in turn typically comprise messages containing system information that are broadcast to all ATs operating in a coverage area, and page and operation-related messages that are transmitted to specific ATs. Traffic packets typically carry user data, such as media and content and the like, to specific ATs.

For purposes of the discussion herein, time slots allocated for transmission of control packets are referred to as control-channel time slots, and the data they bear as control-channel data. Similarly, time slots allocated for transmission of traffic packets are referred to as traffic-channel time slots, and the data they bear as the traffic-channel data. It should be noted, however, that control-channel time slots have the same format and structure as traffic-channel time slots, the only difference being the type of data carried (control-channel data versus traffic-channel data).

In practice, a packet scheduler subdivides packets into time-slot segments, and allocates to each packet a number of time slots according to the number of segments covering the packet. The packet scheduler schedules up to N packets at any one time, where N specifies the periodicity of time-slot interlacing. For example, for N=4, a given packet's segments will occupy every fourth time slot, with the intervening N−1=3 time slots occupied by the other three packets' segments. A time-slot scheduler then schedules time-slot transmissions among the different, scheduled packets to achieve interlaced transmission of time-slot segments.

In conventional operation, once time slots have been allocated for transmission of a given packet (i.e., once the given packet is scheduled by the packet scheduler), that given packet is transmitted in its entirety. That is, transmission of at least one of the N scheduled packets must be complete before the packet scheduler schedules another packet. However, packet encoding includes forward error correction, such that a given packet may be completely transmitted (i.e., successfully received by an access terminal) in fewer than the number of allocated time slots. In this case, the remaining but unnecessary time-slot segments represent unused time slots that allow the packet scheduler to schedule a waiting packet sooner than would be possible if all the allocated time slots were used.

At step 104, the RAN makes a determination that a particular control packet waiting to be scheduled is subject to a delay condition. A delay condition could correspond to a determination that the control packet is carrying a control message containing time-sensitive information. For example, the control message could be a page message to an access terminal informing the access terminal of an incoming push-to-talk message. In order to receive the push-to-talk message, the access terminal might need to respond to the page message by requesting a traffic channel. The page is time-sensitive because delay in transmitting it to the access terminal will result in delay in the access terminal's request for a traffic channel, leading in turn to a delay in receiving the push-to-talk message. Other examples of time-sensitive messages include channel assignment messages to access terminals, and acknowledgements of an access request probes sent by access terminals to the RAN. It will be appreciated that time-sensitive messages may more generally be considered those that are associated with a function or application (e.g., push-to-talk) that is subject to a time constraint (e.g., waiting for a response to a request for an access channel).

A delay condition may additionally or alternatively correspond to determining that transmission of the particular control packet must await completion of transmission of a traffic packet. More specifically, under IS-856, time slots are arranged with a recurring periodicity such that every 256 time slots comprise a "control-channel cycle," and every 12 control-channel cycles comprise a recurring "12-cycle control-channel period" (this is explained in more detail below). Certain types of control messages are schedule such that they are always allocated the same relative time-slot positions within each control-channel cycle. These types of control messages are referred as synchronous or sub-synchronous control messages. However, other types of control messages, referred to as asynchronous control messages, are scheduled whenever the packet scheduler can find available time slots (i.e., asynchronous scheduling). In accordance with conventional operation described above in connection with step 102, an asynchronous control packet must wait for completion of transmission of an already-scheduled traffic packet before the scheduler can schedule its transmission. Thus, a delay condition may also correspond to determining that a control packet is an asynchronous control packet, and in particular one that carries time-sensitive information.

At step 106, in response to the determination made at step 104, a particular traffic packet is identified for which a first total number of traffic-channel time slots has been allocated for transmission of the particular traffic packet, and for which at least a threshold number of the first total number of traffic-channel time slots allocated for transmission of the particular traffic packet remain untransmitted. In view of the explanation above in connection with step 102, such a traffic packet is one that has been scheduled by the packet scheduler, but for which transmission is not yet complete. That is, not all of the traffic packet's time-slot segments have been transmitted. More particularly, in accordance with the example embodiment, identification of the particular traffic packet is made on the basis of the number of untransmitted time-slot segments being at least as large as the threshold number.

In further accordance with the example embodiment, identification of the particular traffic packet is also made on the basis of the service class or priority of the particular traffic packet. More specifically, identification is also based on the particular packet having been classified according to a priority level that permits transmission scheduling on a basis of availability of traffic-channel time slots, wherein availability is determined after other, higher priority packets have been scheduled for transmission. By convention, such a priority level is sometimes referred to as "best effort" service. For purposes of the discussion herein, the term "best effort" will therefore be used. It will be appreciated, however, that other terms could be used as well to characterize a service quality that does not guarantee a minimum level of reliability or an upper limit on delay.

Packets that are classified as best effort generally carry data that is not time-sensitive, or data that support functions and applications that can tolerate delay and/or interruption. For example, retrieval of an email message may be served by best effort transmission, since this is typically not a time-sensitive operation. By contrast, a real-time application, such as "Voice over IP" ("VoIP"), requires more reliable and lower latency transmissions than is generally supported by best effort service.

Finally, at step 108, up to the threshold number of remaining, untransmitted traffic-channel time slots of the particular traffic packet identified at step 106 are reallocated for use as control-channel time slots to transmit the particular control packet. In accordance with the example embodiment, transmission of the particular traffic packet will be canceled, and in its place, transmission of the particular control packet immediately be scheduled. Advantageously, this will reduce delay in transmission of the particular control packet compared with the delay that would result from waiting for the next available time slots.

In accordance with the example embodiment, a second total number of control-channel time slots allocated for transmission of the particular control packet will include up to the threshold number of reallocated time slots from transmission of the particular traffic packet, plus any additional control-channel time slots as necessary. For example, if the particular control packet requires a second total number of 16 control-channel time slots for transmission, and 13 of a first total number of 16 traffic-channel time slots of the particular traffic packet remain untransmitted (and assuming a threshold number of 12), then all 13 remaining traffic-channel time slots will be reallocated for use as control-channel time slots to transmit the particular control packet. In addition, three more control-channel time slots will be allocated to bring the second total number to 16. As another example, if the particular control packet requires a second total number of eight control-channel time slots, and the same particular traffic packet is identified, then only eight of the 13 remaining traffic-channel time slots will be reallocated for use as control-channel time slots to transmit the particular control packet. The difference of five time slots may be used by the packet scheduler to reduce the waiting time an unscheduled packet.

Since the particular control packet has been determined to be carrying time-sensitive information, selective scheduling of control packets will advantageously improve system performance. Further, since the particular traffic packet has been identified according to its classification as best effort service, any negative impact of canceling its transmission will advantageously be minimal. Additionally, identification of the particular traffic packet on the basis of there being at least the threshold number of remaining, untransmitted time slots advantageously helps ensure that nearly-complete transmissions will not be canceled. For example, if the threshold number is 12 out of a first total number of 16 allocated time slots, then no traffic packet for which transmission is generally more than ¼ complete (i.e., more than four time slots transmitted) would be indentified and subject to transmission cancelation.

In further accordance with the example embodiment, the threshold number could be determined according to a fraction of the total number of allocated time slots. For example, for 16-slot transmissions, a fraction of ¾ would correspond to a threshold number of 12, as illustrated above. The same fraction applied to an eight-slot transmission would correspond to a threshold number of six.

As an alternative to identification of the particular traffic packet on the basis of a threshold number of remaining, untransmitted time slots, identification could be based on a determining that no greater than a different threshold number time slots have been transmitted. This alternative is essentially a corresponding equivalent to the approach described above. For example, specifying that at least 12 time slots must remain untransmitted is equivalent to specifying that no more than four have been transmitted.

It will be appreciated that the steps of FIG. 1 are illustrated by way of example, and that additional and/or alternative steps or alternative ordering of steps could be carried in order to achieve selective scheduling of control packets. For instance, in an alternative embodiment, transmission of the particular traffic packet could be suspended instead of immediately canceled. After transmission of the particular control packet is complete, transmission of the particular traffic packet could then be resumed or canceled. Further details related to some of the steps shown in FIG. 1 are discussed below. Finally, it should be noted that the terms "first" and "second" as applied to "total number" are used herein as labels for the sake of convenience, and are not intended to imply a numerical ordering (although such an ordering in not necessarily excluded).

Figure 2:
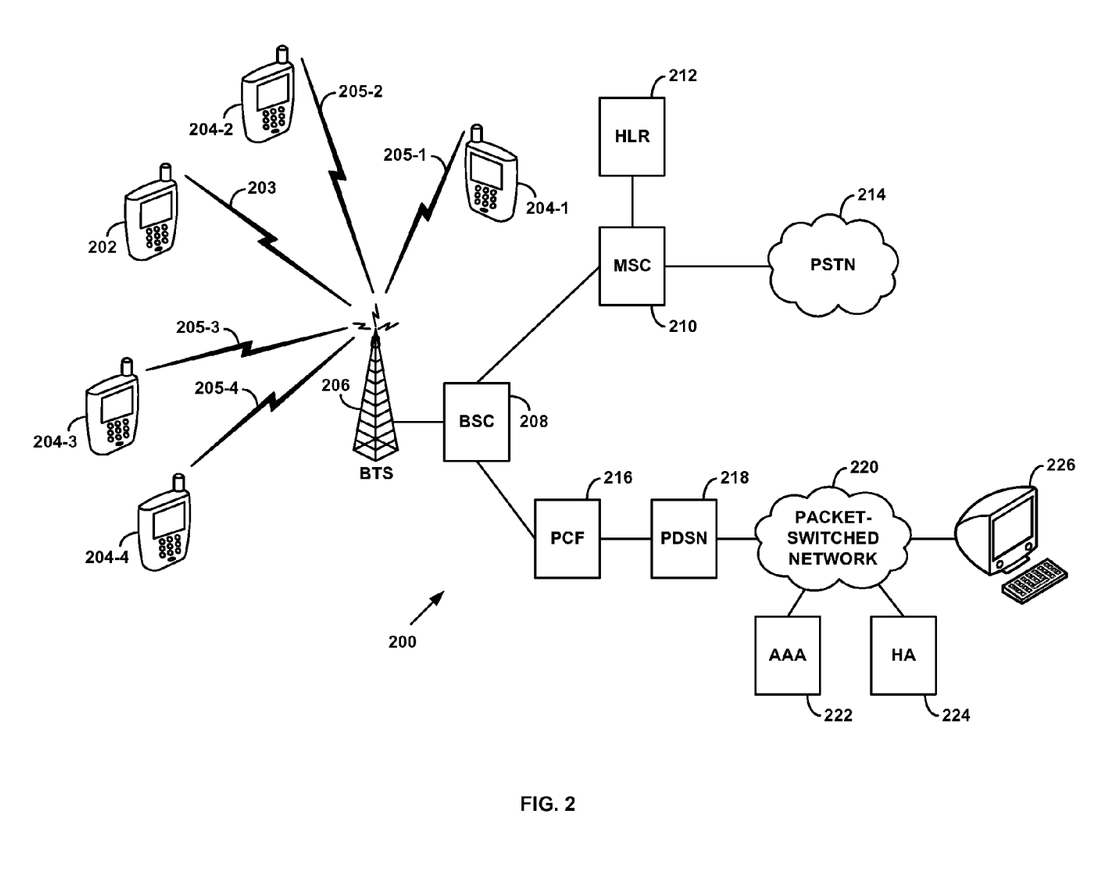
FIG. 2 is a simplified block diagram of a wireless communication system in which an example embodiment of selective scheduling of control packets could be carried out.

FIG. 2 shows a simplified block diagram of a wireless communication system 200 in which an exemplary embodiment of selective scheduling of control packets can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link"). Four other access terminals, AT 204-1, 204-2, 204-3, and 204-4, are also depicted in FIG. 2. As indicated, they communicate with BTS 206 over air interfaces 205-1, 205-2, 205-3, and 205-4, respectively. Each of these air interfaces is operationally similar to air interface 203, each representing at least a forward and reverse link. It will be appreciated that this arrangement is for purposes of illustration.

BSC 208 is connected to MSC 210, which acts to control assignment of air traffic channels (e.g., over air interfaces 203, 205-1, 205-2, 205-3, and 205-4), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 202, 204-1, 204-2, 204-3, and 204-4 typically comprises a user-interface, I/O components, a communication interface, a tone detector, a processing unit, and data storage, all of which may be coupled together by a system bus or other mechanism. As such, system 200, ATs 202, 204-1, 204-2, 204-3, and 204-4, and air interfaces 203, 205-1, 205-2, 205-3, and 205-4 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. As a result of the full-power allocation by the sector, an access terminal operating under IS-856 can, in theory, receive packet-data at a rate of at least 38.4 kbps and up to 2.4 Mbps.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise EVDO control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire an EVDO packet data connection, after an access terminal first detects an IS-856 carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

4. Selective Scheduling of Control Packets a. Interlaced Transmission of Control Packets and Traffic Packets Under IS-856, a given access terminal receives EVDO control messages from the RAN on a control channel that is time-division multiplexed with traffic channels to individual ATs, as mentioned above, and described in further detail below. EVDO control messages include system information broadcast to all ATs having active data sessions, as well as page messages directed to specific ATs. Page messages are used to send information, alerts, and requests requiring responses. For instance, an AT is alerted of an incoming Voice over IP (VoIP) call or push-to-talk session via a page message. For purposes of the discussion herein, an EVDO control message carrying system information shall be referred to as an "EVDO control-channel message," while an EVDO control message carrying a page message shall be referred to as an "EVDO paging message." It may be possible for a single EVDO control message to carry both an EVDO control-channel message and an EVDO paging message. EVDO control-channel messages and EVDO paging messages can be considered examples of the more generally-termed control messages discussed above.

Both control messages and user-specific data, such as email, VoIP media, push-to-talk messages, and other data and media services, are assembled into link-layer packets, which are then subdivided into time-slot segments and scheduled for transmission in time slots on the forward link. As discussed above, "traffic packets" carry "traffic-channel data" that is transmitted in "traffic-channel time slots," and "control packets" carry "control-channel data" that is transmitted in "control-channel time slots." In EVDO communications (i.e., under IS-856), a control packet is an EVDO physical-layer control-data packet. As is known in the art, such a packet can contain a partial EVDO control message, a whole EVDO control message, or more than one EVDO control message. Again, the designations of traffic data, control data, and the like are used herein as a convenience in identifying the type of data carried in any given time slot; the formats of both designated types of time slots are otherwise the same.

The nominal number of time slots required to transmit either a traffic packet or a control packet depends on the forward-link data rate and the encoding method used. For instance, a data rate of 38.4 kbps using QPSK encoding nominally requires 16 time slots to transmit one packet. As another example, a data rate of 76.8 kbps using QPSK encoding nominally requires eight time slots to transmit one packet. These two data and packetization rates apply to both control packets and traffic packets. Other, higher rates that use fewer time slots may also be used, but typically apply only to traffic packets. For example, a data rate of 1,228.8 kbps using 16-QAM encoding nominally requires just two time slots to transmit one traffic packet. In the discussion herein of control packets, only 8-slot control packets (i.e., 76.8 kbps) will be considered, for purposes of illustration, unless otherwise stated. However, it will be appreciated the methods and principles discussed herein are not limited to 8-slot control packets, and that 16-slot control packets, or even control packets of other lengths, remain within the scope and spirit of the present invention.

Time-slot segments of a given packet are encoded with incremental forward error correction such that the actual number of time slots required to fully transmit a packet may be less than the nominal number. The time-slot segments are transmitted in every $N^{th}$ time slot, where N=4 for EVDO, giving the receiving access terminal time to decode the time-slot data of a received time-slot segment and determine if the packet is complete or if at least the next time-slot segment is needed. The access terminal then responds with an "ACK" if the packet reception was completed with reception of the last time-slot segment or with a "NACK" if not.

The RAN in turn transmits the next time-slot segment (N time slots after the last segment) if it receives a NACK from the access terminal. If the RAN receives an ACK before all of the time-slot segments have been transmitted, it does not transmit any of the remaining time-slot segments, but instead begins transmitting time-slot segments for the next scheduled packet (possibly to a different access terminal). This is referred to as "early termination" of packet transmission, and it allows the RAN to begin transmission of the next packet sooner than if all the time-slot segments of the given packet needed to be transmitted.

The three time slots in between every fourth one for a given packet are used for transmission of other packets (to the same or different access terminals), each of which is similarly spread out over every fourth time slot. The interleaving of time slots in this manner is what is referred to as "interlacing," wherein EVDO uses "4-slot interlacing."

In practice, the RAN transmits control messages to access terminals during periodically-recurring 12-cycle control-channel periods, as described above. Each 12-cycle control-channel period comprises 12 consecutive "EVDO control-channel cycles," such that any given one of the EVDO control-channel cycles recurs once every $12^{th}$ cycle. EVDO control-channel cycles can be considered examples of the more generally-termed control-channel cycles discussed above. The RAN schedules transmission of control messages to occur in the periodic recurrences of each control-channel cycle. While access terminals may receive certain control messages during more than one control-channel cycle of a recurrence of the 12-cycle control-channel period, page messages for any given AT are sent only during an AT-specific one of the recurring control-channel cycles (and only if there is a page message to be sent to that AT). More particularly, a "hashing function" executed by the RAN or by each AT is used to assign each AT to a specific control-channel cycle within the recurring 12-cycle control-channel period. In turn, the AT then monitors each periodic recurrence of its assigned control-channel cycle for page messages. The hashing function effectively randomizes the assignments of ATs to the control-channel cycles such that, on average, no one cycle is assigned more ATs than any other cycle. In this sense, each AT is "eligible" to receive control messages at least during its assigned control-channel cycle, and possibly during other cycles as well.

Forward-link transmissions are grouped in frames, each frame being 16 time slots in length, and every 16 frames comprising one control-channel cycle. Each control-channel cycle therefore contains 256 time slots. Since each time slot is 1.67 ms in duration, each control-channel cycle spans 426.67 ms, and each 12-cycle control-channel period spans 5.12 seconds. Put another way, each control-channel cycle recurs with a period of 5.12 seconds, so that a given AT monitors for page messages from the RAN every 5.12 seconds, when the AT's assigned control-channel cycle recurs. Note that scheduling of traffic packets is not generally tied to any particular control-channel cycle, so that traffic-channel time slots for a given AT can occur largely anywhere during a 12-cycle control-channel period (though possibly subject to other scheduling constraints).

Control messages can be transmitted in synchronous, sub-synchronous, or asynchronous "capsules," depending on the type or content of the message. Synchronous capsules are transmitted in control packets that occupy fixed relative positions within each control-channel cycle. Asynchronous capsules are transmitted in control packets that are allocated any of the other time slots in each control-channel cycle (except for the fixed positions), but on an availability basis. Thus, asynchronous control packets and traffic packets are allocated time slots from the same pool of time slots, namely those not pre-assigned to synchronous control packets. With 4-slot interlacing, each control-channel cycle can accommodate up to eight 8-slot synchronous control packets, each spanning 32 time slots at fixed relative offsets within the control-channel cycle, and leaving 192 time slots for asynchronous control packets and traffic-channel data.

Figure 3:
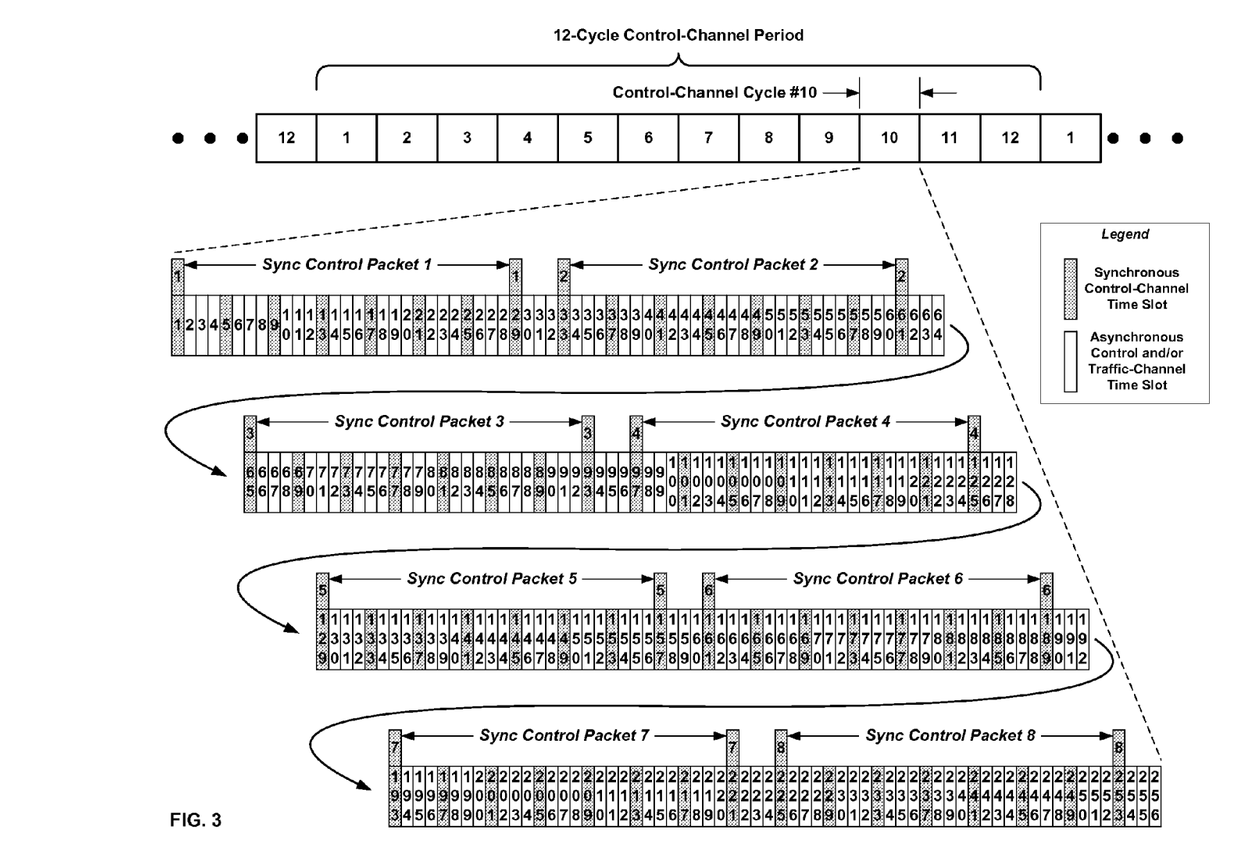
FIG. 3 illustrates the operational principles of interlacing of control-channel data and traffic-channel data.

FIG. 3 illustrates the arrangement of time slots in control-channel cycles described above. At the top of the figure, a 12-cycle control-channel period is depicted with control-channel cycles numbered 1, 2, 3, ..., 12. Also shown are the last cycle (#12) of the immediately preceding period and the first cycle (#1) of the immediately following period. These last and first control-channel cycles (as well as leading and trailing ellipses) are meant to represent the periodic recurrence of the 12-cycle control-channel periods.

The organization of time slots is shown below the 12-cycle control-channel period, with control-channel cycle #10 taken as an example. The following discussion could apply to any of the other control-channel cycles as well. Cycle #10 is magnified to show all 256 time slots, and in order to fit on one page, the magnified view is broken into four segments: time slots {1-64}, {65-128}, {129-192}, and {193-256}; s-shaped arrows indicate the contiguity between the segments. Dashed lines connect the start and end of the cycle in the top view with the extent of the cycle in the magnified view. The time slots in the magnified view are numbered 1, 2, 3, ..., 256, and as indicated by the "Legend" at the right of the figure, synchronous control-channel time slots are shown in gray, while asynchronous control-channel time slots and/or traffic-channel time slots are shown in white.

In the present illustration, the first synchronous control packet, labeled "Sync Control Packet 1," occupies every fourth time slot, beginning with time slot 1 and ending with time slot 29; i.e., the gray time slots numbered 1, 5, 9, 13, 17, 21, 25, and 29. As shown, the intervening white time slots are asynchronous control-channel time slots and/or traffic-channel time slots. Gray blocks labeled "1" are shown above each of time slot 1 and time slot 29 to illustrate the extent of the first synchronous control packet. With 4-slot interlacing, the second synchronous control packet, labeled "Sync Control Packet 2," begins at time slot 33 (i.e., after a delay of three asynchronous control-channel time slots and/or traffic-channel time slots), and occupies every fourth time slot up to and including time slot 61. Again, the intervening white time slots are asynchronous control-channel time slots and/or traffic-channel time slots. And similarly to Sync Control Packet 1, gray blocks labeled "2" are placed above each of time slot 33 and time slot 61 to illustrate the extent of the second synchronous control packet. A similar arrangement of time slots is shown for the remaining synchronous control packets, labeled "Sync Control Packet 3," "Sync Control Packet 4," "Sync Control Packet 5," "Sync Control Packet 6," "Sync Control Packet 7," and "Sync Control Packet 8." As shown, there are three asynchronous control-channel time slots and/or traffic-channel time slots between each of these synchronous control packets (and prior to Sync Control Packet 3).

b. Operational Principles of Selective Scheduling of Control Packets

With 4-slot interlacing, a maximum of four packets (i.e., up to four packets) can be in active transmission at any one time. (More generally, with N-slot interlacing, a maximum of N packets can be in active transmission at any one time.) For the purposes of discussion herein, "active transmission" shall refer to scheduling of a packet, generation of the packet's nominal number of time-slot segments (each appropriately encoded with incremental forward error correction), and allocation of the nominal number of time slots for transmission. A packet in active transmission may also have had one or more of its time-slot segments already transmitted. Since active transmission describes a transmission that is underway, the term "in-progress transmission" will also be used to describe an active transmission.

In practice, selection and processing of a given packet for active transmission from among waiting packets is carried out by a packet scheduler, which is typically implemented in the RAN. Selection of the next time-slot segment for transmission from among the (up to) four packets in active transmission is then carried out by a time-slot scheduler, also typically implemented in the RAN. The time-slot scheduler operates so as to achieve 4-slot interlacing among the time-slot segments of the (up to) four packets in active transmission, and also to ensure that synchronous control packets are transmitted according to their fixed relative time slots in each control-channel cycle. When transmission of any one of the (up to) four packets in active transmission completes, using either all of the packet's time-slot segments or fewer than the packet's nominal number of time-slot segments (i.e., early termination), the packet scheduler selects and processes a next packet for active transmission. While the details of how the packet scheduler operates may vary between different implementations, under EVDO the packet scheduler does not place the next packet into active transmission until transmission of one of the four packets currently being transmitted is complete. Consequently, an asynchronous control packet (or traffic packet) that needs to be scheduled for transmission must wait for completion of transmission of any asynchronous control packet or traffic packet currently in active transmission.

It may happen from time to time that an asynchronous control packet awaiting scheduling by the packet scheduler carries time-sensitive information for an access terminal. For example, an asynchronous packet might carry an acknowledgement to an access terminal's access probe request. Under EVDO this acknowledgement message is referred to as an "AcAck." Another example is a traffic channel assignment message to an access terminal. Both of these are examples of messages that are part of control transactions that establish or support communications with between the RAN and the access terminal. Transactions of these types can be subject to time constraints, such that a delay in transmission of a transaction message may result in a failed transaction or poor quality of a communication service. In conventional EVDO operation, such an asynchronous control packet can be subject to intolerable or unacceptable delay while it waits for completion of transmission of a traffic packet (or other asynchronous control packet).

In accordance with an example embodiment of selective scheduling of control packets, the RAN will advantageously reduce or eliminate the delay in transmitting an asynchronous control message by selectively preempting active transmission of a traffic packet and replacing it with immediate transmission of the asynchronous control packet. More specifically, when the RAN receives a particular asynchronous control packet carrying time-sensitive information needs to be scheduled for transmission on the air interface, it will determine if any of the packets currently in active transmission is a traffic packet with at least a threshold number of traffic-channel time slots that remain untransmitted. If the RAN identifies such a traffic packet, the RAN will further determine if the identified traffic packet is classified according to best effort service, or a similarly-characterized service level (as discussed above, for example). If the RAN identifies a particular traffic packet in active transmission that is both a best effort packet and has at least a threshold number or traffic-channel time slots remaining untransmitted, the RAN will cancel transmission of the particular traffic packet and reallocate up to the threshold number of its traffic-channel time slots for use as control-channel time slots to transmit the particular asynchronous control packet. It will be appreciated that the RAN could first identify a best effort traffic packet, and then determine that packet has at least the threshold number of traffic-channel time slot remaining untransmitted.

In accordance with the example embodiment, reallocation of the particular traffic packet's traffic-channel time slots will comprise scheduling the particular asynchronous control packet for active transmission. Thus, the packet scheduler will replace the untransmitted time-slot segments of the particular traffic packet with time-slot segments generated for the particular asynchronous control packet. In so doing, the nominal number of control-channel time slots allocated for transmission of the particular asynchronous control packet may be smaller, the same, or larger than the number of remaining untransmitted traffic-channel time slots of the particular traffic packet.

If the nominal number of time-slot segments required to transmit the particular asynchronous control packet is smaller than the number of remaining untransmitted traffic-channel time slots of the particular traffic packet, then the number of reallocated time slots will be smaller than the threshold number. If the nominal number of time-slot segments required to transmit the particular asynchronous control packet is larger than the number of remaining untransmitted traffic-channel time slots of the particular traffic packet, then the number of reallocated time slots will equal the threshold number, and an additional number of time slots will be allocated to transmission of the particular asynchronous control packet to make up the difference. If the nominal number is equal to the threshold number, then the number of reallocated time slots will equal the threshold number, with no additional control-channel time slots needing to be allocated.

In further accordance with the example embodiment, the distinction between reallocating fewer, the same, or greater than the threshold number of traffic-channel time slots of the particular traffic packet could be transparent to the scheduling process. Specifically, if the packet scheduler simply replaces all of the remaining, untransmitted time-slot segments of the particular traffic packet with the nominal number of time-slot segments of the particular asynchronous control packet, then the arithmetic of the various reallocation scenarios is accounted for implicitly, so that the RAN (or the packet scheduler) does not necessarily need to handle each scenario differently.

By identifying the particular traffic packet according to there being at least the threshold number of traffic-channel time slots remaining untransmitted, the RAN can advantageously help ensure that a transmission that is nearly complete is not canceled. The threshold number can be set to correspond to a fraction or percentage of the nominal number of time-slot segments of the particular traffic packet. In this way, the RAN can identify only traffic packets having at least the fraction or percentage of the nominal number of time-slot segments remaining untransmitted. By additionally identifying the particular traffic packet according it service classification, the RAN can advantageously ensure that only a best effort (or similarly classified) transmission can be canceled and replace by transmission of an asynchronous control packet.

Selective scheduling of control packets, as illustrated in principle by way of the example embodiment, therefore achieves the benefits of minimal delay in transmission on the air interface of asynchronous control packets carrying time-sensitive information to access terminals, while limiting or minimizing any negative impact on transmission of traffic packets.

5. Example Embodiment of Selective Scheduling of Control Packets

Figure 4:
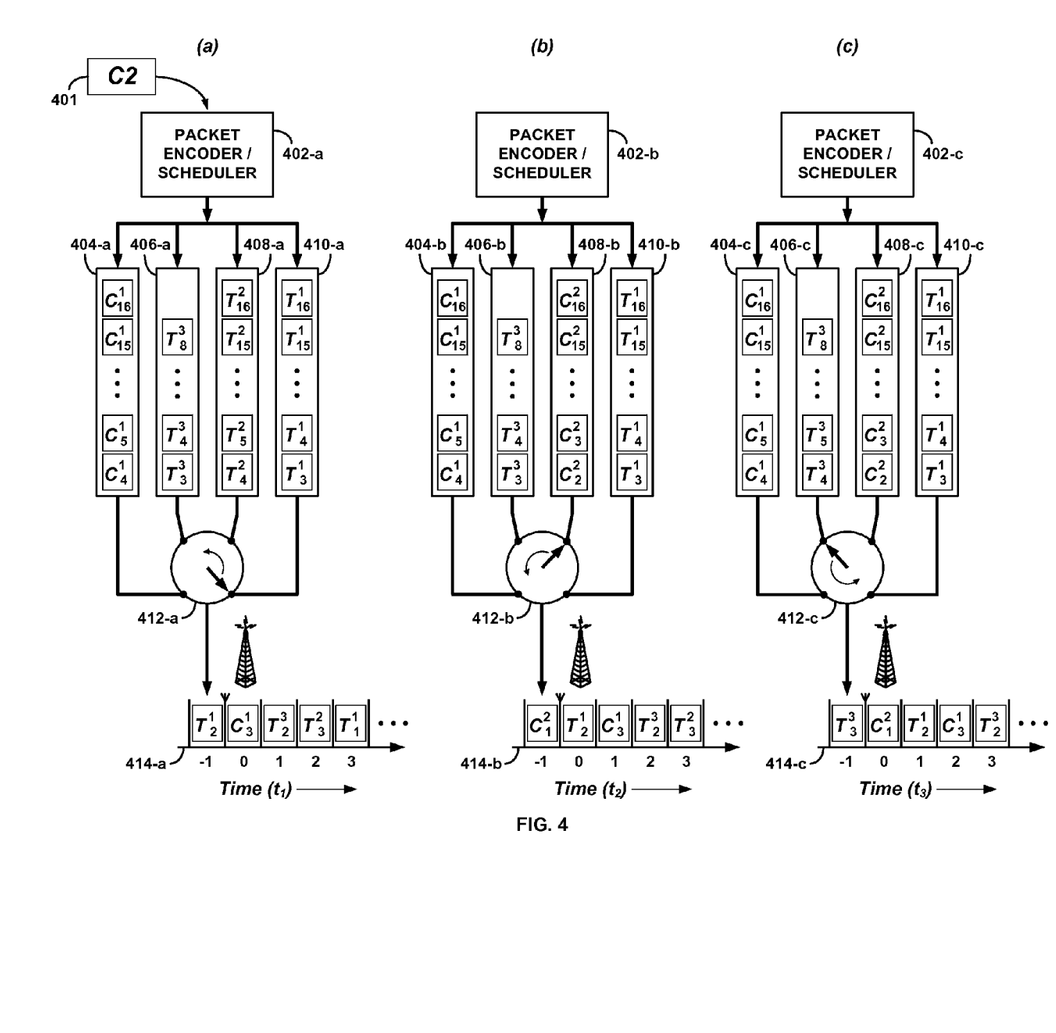
FIG. 4 depicts an example embodiment illustrating the operational principles of selective scheduling of control packets.

The operational principles of selective scheduling of control packets, as well as example implementation of methods and means according to those principles, are further illustrated by way of the example embodiment with more detail in FIG. 4. The figure includes three panels, labeled "(a)," "(b)," and "(c)," which represent snapshots of the embodiment at three different instants in time, from $t_1$ in panel (a), to $t_2=t_1+\Delta t$ in panel (b), to $t_3=t_2+\Delta t$ in panel (c), wherein $\Delta t$ is the equivalent of one time slot (1.67 ms). The elements of the embodiment shown in each panel are packet encoder/scheduler 402, packet transmit buffers 404, 406, 408, and 410, and time-slot scheduler 412. Each buffer contains time-slot segments of one packet in active transmission, and the four buffers together account for the (up to) four packets that can be in active transmission at any one time with 4-slot interlacing.

The time-slot scheduler is represented by a selector-arrow that sweeps counterclockwise from one transmit buffer to the next. When the selector-arrow points to (selects) a particular transmit buffer, the time-slot segment at the head of that buffer is transmitted on the next time slot, and all the remaining time-slot segments in that buffer advance one position toward the head of the buffer. Each panel also depicts a timeline 414 of transmission of the five most recent time-slot segments (the choice five time-slot segments is arbitrary; the purpose is to provide an illustrative cue representing the temporal evolution from one panel to the next).

Any given element of the example embodiment is the same in all three panels, but the numerical item number of each element is appended with a letter "a," "b," or "c," depending on which panel is being discussed.

In each panel, time-slot segments of various control and traffic packets are represented by boxes labeled with packet and segment identifiers. More specifically, each box representing a time-slot segment of a traffic packet is labeled with a "T" having a superscript that signifies packet identification and a subscript that signifies time-slot segment index in a sequence of time-slot segments. Each box representing a time-slot segment of a control packet is similarly labeled with a "C" instead of a "T." Ellipses between time-slot segments represent intervening time-slot segments that are omitted from the figure for the sake of brevity. The particular contents shown in each transmit buffer are meant to exemplify operation, and are not limiting with respect to the invention or embodiments thereof.

For example, buffer 406-a is shown as containing the last six of eight nominal time-slot segments generated for traffic packet T3, namely $\{T_3^3, T_4^3, T_5^3, T_6^3, T_7^3, T_8^3\}$, wherein $T_5^3$, $T_6^3$ and $T_7^3$ are represented by vertical ellipses. Evidently, the first two time-slot segments of traffic packet T3, namely $T_1^3$ and $T_2^3$, have already been transmitted in associated time slots. Similarly, buffer 404-a is shown as containing the last 13 of 16 nominal time-slot segments generated for control packet C1, namely $\{C_4^1, C_5^1, C_6^1, C_7^1, C_8^1, C_9^1, C_{10}^1, C_{11}^1, C_{12}^1, C_{13}^1, C_{14}^1, C_{15}^1, C_{15}^1\}$ wherein $C_6^1, C_7^1, C_8^1, C_9^1, C_{10}^1, C_{11}^1, C_{12}^1, C_{13}^1$, and $C_{14}^1$ are represented by vertical ellipses. Evidently, the first three time-slot segments of traffic packet C1, namely $C_1^1, C_2^1$ and $C_3^1$, have already been transmitted in associated time slots.

At time $t_1$ (panel (a)), time-slot scheduler 412-a has selected transmit buffer 410-a, which contains traffic packet T1. More specifically, with the selection of transmit buffer 410-a, time-slot segment $T_2^1$ has been place in transmission at the time slot labeled "−1." The remaining time-slot segments, namely $\{T_3^1, T_4^1, \ldots, T_{15}^1, T_{16}^1\}$, have all advanced one position toward the head of transmit buffer 410-a, such that time-slot segment $T_3^1$ will be the next segment of T1 to be transmitted (unless the receiving access terminal sends an ACK, leading to early termination). As indicated in timeline 414-a, the four most recent time-slot transmissions prior to the current one of $T_2^1$ are (from most to least recent) $C_3^1, T_2^3$, $T_3^2$, and $T_1^1$, at time slots 0, 1, 2, and 3, respectively. These transmissions correspond the same ordering of the most recently-selected transmit buffers by the time-slot scheduler. The cartoon of a BTS tower represents transmission of these time-slot segments.

Also shown in panel (a) is the arrival at packet encoder/scheduler 402-a of a control packet 401, designated "C2." By way of example, C2 is taken to be an asynchronous control packet that contains time-sensitive information. Also by way of example, C2 is assumed to require a nominal number of 16 time-slot segments. Note that, although not shown, other packets may be arriving at the encoder/scheduler. In accordance with the example embodiment, a determination will be made that C2 is an asynchronous control packet that contains time-sensitive information. The determination could be made by the encoder/scheduler or by some other element of the RAN that provides this information to the encoder/scheduler.

For the purposes of illustration, it is assumed that traffic packet T2 is classified has best effort (or a similarly-characterized service class), and that the threshold number is 12. Hence, in further accordance with the example embodiment, the encoder/scheduler (or some other element of the RAN) identifies traffic packet T2 in transmit buffer 408-a as a traffic packet whose active transmission can be canceled and replaced by immediate transmission of control packet C2. Specifically, in addition to identifying T2 as being classified as best effort, the encoder/scheduler recognizes that only the first three time-slot segments of T2 have been transmitted, leaving 13, and hence at least the threshold number, still untransmitted. As noted above, the threshold number could be set to correspond to a fraction of the total, nominal number of time-slot segments. For instance, a fraction set of ¾ would correspond to a threshold of 12 for a nominal number of 16, but would correspond to a threshold of six for a nominal number of eight.

In accordance with the example embodiment, the encoder/scheduler 402-a replaces all of the time-slot segments of T2 in transmit buffer 408-a with 16 time-slot segments generated for transmission of control packet C2. Evidently, this replacement has been accomplished by time $t_2$, when time-slot scheduler 412-b selects transmit buffer 408-b. As illustrated in timeline 414-b of panel (b), the first time-slot segment $C_1^2$ of C2 has been place in transmission at time slot −1. The remaining time-slot segments of C2, namely $\{C_2^2, C_2^2, \ldots, C_{15}^2, C_{16}^2\}$, have all advanced one position toward the head of transmit buffer 408-b, such that time-slot segment $C_2^2$ will be the next segment of C2 to be transmitted (unless the receiving access terminal sends an ACK, leading to early termination). As indicated in timeline 414-b, the four most recent time-slot transmissions prior to the current one of $C_1^2$ are now (from most to least recent) $T_2^1, C_3^1, T_2^3$, and $T_3^2$, at time slots 0, 1, 2, and 3, respectively. These transmissions correspond the same ordering of the most recently-selected transmit buffers by the time-slot scheduler.

Thus, in accordance with the example embodiment, scheduling and transmission of an asynchronous control packet carrying time-sensitive information has advantageously been expedited so as to reduce or eliminate any delay that might otherwise occur by waiting for an active transmission of a best effort traffic packet to complete. Also, the trade-off required to achieve the expedited scheduling advantageously has minimal impact on system performance and service delivery, since the active transmission that is preempted is one of a best effort packet that was not nearly complete when preemption was invoked.

Finally, at time $t_3$ (panel (c)), time-slot scheduler 412-*c* has selected transmit buffer 406-*c*, which contains traffic packet T3. With the selection of transmit buffer 406-*c*, time-slot segment $T_3^3$ has been place in transmission at time slot −1. The remaining time-slot segments of T3, namely $\{T_4^3, T_5^3, \ldots, T_8^3\}$, have all advanced one position toward the head of transmit buffer 406-*c*, such that time-slot segment $T_4^3$ will be the next segment of T1 to be transmitted (unless the receiving access terminal sends an ACK, leading to early termination). As indicated in timeline 414-*c*, the four most recent time-slot transmissions prior to the current one of $T_3^3$ are now (from most to least recent) $C_1^2, T_2^1, C_3^1,$ and $T_2^3$, at time slots 0, 1, 2, and 3, respectively. These transmissions correspond the same ordering of the most recently-selected transmit buffers by the time-slot scheduler.

It will be appreciated that operation of the example embodiment can extend beyond time $t_3$, and begins before time $t_1$. The three times shown in panels (a), (b), and (c) of FIG. 4 serve as illustrations of operation of the example embodiment of elective scheduling of control packets.

Implementation of the example embodiment in a RAN or one or more elements of a RAN (e.g., BSC, BTS, etc.) could take various forms. For example, each of transmit buffers 404, 406, 408, and 410 could be implemented in one or more forms of computer accessible memory, such as "random access memory" (or "RAM," which is a well-known term in the art), disk, processor registers, or other solid-state memory. The packet scheduler/encoder could include one or more general purpose or special purpose processors with associated memory and registers, and could carry out encoding and scheduling functions described above by executing machine-language instructions stored in one or more forms of memory. Similarly, the time-slot scheduler 412 could include one or more of the same or different processors, as well as one or more high-precision clocks for timing purposes, and execute machine-language instructions stored in one or more forms of memory. Transmission of time-slot segments could then be carried out by the BTS under instruction of a BSC or other RAN element. Some aspects of operation, such as packet encoding (including generation of time-slot segments appropriate to a particular forward-link data rate) may incorporate methods and means that are employed in conventional operation of a wireless communication system. Finally, it will be appreciated that embodiment described above provides an example selective scheduling of control packets, and that other embodiments are possible as well.

6. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a wireless communication system that includes a Radio Access Network (RAN), a method of transmitting control messages to access terminals, the method being carried out by the RAN and comprising:

on a radio frequency interface, using time-division multiplexing to transmit control packets and traffic packets to access terminals, each control packet being transmitted in its entirety over the course of a respective plurality of regularly-space control-channel time slots, and each traffic packet being transmitted in its entirety over the course of a respective multiplicity of regularly-space traffic-channel time slots, wherein control-channel time slots and traffic-channel time slots are interlaced;

making a determination that a particular control packet to be scheduled for transmission is subject to a delay condition;

in response to the determination, identifying a particular traffic packet for which a first total number of the respective multiplicity of regularly-spaced traffic-channel time slots have been allocated for transmission of the particular traffic packet, and for which at least a threshold number of the first total number of the respective multiplicity of regularly-spaced traffic-channel time slots allocated for transmission of the particular traffic packet remain untransmitted; and reallocating up to the threshold number of the remaining, untransmitted traffic-channel time slots of the particular traffic packet for use as control-channel time slots to transmit the particular control packet.

2. The method of claim 1, wherein the wireless communication system operates according to a CDMA family of protocols, and wherein each of the control packets is an EVDO physical-layer control-data packet, each EVDO physical-layer control-data packet containing a partial, a whole, or more than one EVDO control message, each EVDO control message being one of at least an EVDO control-channel message and an EVDO paging message.

3. The method of claim 1, wherein making the determination that the particular control packet to be scheduled for transmission is subject to a delay condition comprises:

determining that the particular control packet is carrying time-sensitive information for an access terminal; and determining that transmission of the particular control packet cannot begin earlier than completion of an in-progress transmission of a traffic packet.

4. The method of claim 3, wherein the wireless communication system operates according to a CDMA family of protocols, and wherein the particular control packet is an asynchronous control packet carrying a message, the message being selected from the group consisting of a traffic channel assignment message, and an access probe acknowledgement.

5. The method of claim 3, wherein determining that the particular control packet is carrying time-sensitive information for an access terminal comprises identifying a message carried in the particular control packet as being of a type associated with a function that is subject to a timing constraint.

6. The method of claim 1, wherein identifying the particular traffic packet comprises identifying the particular traffic packet as being classified according to a priority level that permits transmission scheduling on a basis of availability of traffic-channel time slots, availability being determined after other, higher priority packets have been scheduled for transmission.

7. The method of claim 1, wherein identifying the particular traffic packet for which the first total number of the respective multiplicity of regularly-spaced traffic-channel time slots have been allocated for transmission of the particular traffic packet, and for which at least the threshold number of the first total number of the respective multiplicity of regularly-spaced traffic-channel time slots allocated for transmission of the particular traffic packet remain untransmitted comprises setting the threshold number to correspond to a particular fraction of the first total number.

8. The method of claim 1, wherein reallocating up to the threshold number of the remaining, untransmitted traffic-channel time slots of the particular traffic packet for use as control-channel time slots to transmit the particular control packet comprises:

canceling transmission of the particular traffic packet prior to transmitting any of the threshold number of remaining, untransmitted traffic-channel time slots of the particular traffic packet;

allocating a second total number of control-channel times slots for transmission of the particular control packet, the second total number being smaller than the threshold number; and transmitting the particular control packet in its entirety over the course of up to the second total number of control-channel time slots.

9. The method of claim 1, wherein reallocating up to the threshold number of the remaining, untransmitted traffic-channel time slots of the particular traffic packet for use as control-channel time slots to transmit the particular control packet comprises:

canceling transmission of the particular traffic packet prior to transmitting any of the threshold number of remaining, untransmitted traffic-channel time slots of the particular traffic packet;

allocating a second total number of control-channel times slots for transmission of the particular control packet, the second total number being at least as large as the threshold number; and transmitting the particular control packet in its entirety over the course of up to the second total number of control-channel time slots.

10. The method of claim 9, wherein the second total number is larger than the threshold number.

11. In a wireless communication system that includes a Radio Access Network (RAN), a method of transmitting control messages to access terminals, the method being carried out by the RAN and comprising:

on a radio frequency interface, using time-division multiplexing to transmit control packets and traffic packets to access terminals, each control packet being transmitted in its entirety over the course of a respective plurality of regularly-space control-channel time slots, and each traffic packet being transmitted in its entirety over the course of a respective multiplicity of regularly-space traffic-channel time slots, wherein control-channel time slots and traffic-channel time slots are interlaced;

making a determination that a particular control packet that is subject to a delay condition cannot be scheduled for transmission earlier than completion of an in-progress transmission of a particular traffic packet, wherein a first total number of the respective multiplicity of regularly-spaced traffic-channel time slots have been allocated for transmission of the particular traffic packet;

determining that at least a threshold number of the first total number of the respective multiplicity of regularly-spaced traffic-channel time slots allocated for the particular traffic packet remain untransmitted;

suspending transmission of the particular traffic packet prior to transmitting any of the remaining, untransmitted traffic-channel time slots of the particular traffic packet; and reallocating up to the threshold number of the remaining, untransmitted traffic-channel time slots of the particular traffic packet for use as control-channel time slots to transmit the particular control packet.

12. The method of claim 11, wherein the wireless communication system operates according to a CDMA family of protocols, wherein each of the control packets is an EVDO physical-layer control-data packet, each EVDO physical-layer control-data packet containing a partial, a whole, or more than one EVDO control message, each EVDO control message being one of at least an EVDO control-channel message and an EVDO paging message, and wherein making the determination comprises identifying the particular control packet as being an asynchronous control packet that carries a message, the message being selected from the group consisting of a traffic channel assignment message, and an access probe acknowledgement.

13. The method of claim 11, wherein determining that at least the threshold number of the first total number of the respective multiplicity of regularly-spaced traffic-channel time slots allocated for the particular traffic packet remain untransmitted comprises identifying the particular traffic packet as being classified according to a priority level that permits transmission scheduling on a basis of availability of traffic-channel time slots, availability being determined after other, higher priority packets have been scheduled for transmission.

14. The method of claim 11, wherein determining that at least the threshold number of the first total number of the respective multiplicity of regularly-spaced traffic-channel time slots allocated for the particular traffic packet remain untransmitted comprises setting the threshold number to correspond to a particular fraction of the first total number.

15. The method of claim 11, wherein suspending transmission of the particular traffic packet prior to transmitting any of remaining, untransmitted traffic-channel time slots of the particular traffic packet comprises canceling transmission of the particular traffic packet prior to transmitting any of remaining, untransmitted traffic-channel time slots of the particular traffic packet.

16. The method of claim 11, wherein reallocating up to the threshold number of the remaining, untransmitted traffic-channel time slots of the particular traffic packet for use as control-channel time slots to transmit the particular control packet comprises:

allocating a second total number of control-channel times slots for transmission of the particular control packet, the second total number being smaller than the threshold number; and transmitting the particular control packet in its entirety over the course of up to the second total number of control-channel time slots.

17. The method of claim 11, wherein reallocating up to the threshold number of the remaining, untransmitted traffic-channel time slots of the particular traffic packet for use as control-channel time slots to transmit the particular control packet comprises:

allocating a second total number of control-channel times slots for transmission of the particular control packet, the second total number being at least as large as the threshold number; and transmitting the particular control packet in its entirety over the course of up to the second total number of control-channel time slots.

18. A wireless communication system comprising:
one or more processors;
memory; and machine-readable instructions stored in the memory, that upon execution by the one or more processors cause the wireless communication system to carry out operations including:

using time-division multiplexing on a radio frequency interface to transmit control packets and traffic packets to access terminals, wherein each control packet is transmitted in its entirety over the course of a respective plurality of regularly-space control-channel time slots, and each traffic packet is transmitted in its entirety over the course of a respective multiplicity of regularly-space traffic-channel time slots, and wherein control-channel time slots and traffic-channel time slots are interlaced, making a determination that a particular control packet that is subject to a delay condition cannot be scheduled for transmission earlier than completion of an in-progress transmission of a particular traffic packet, wherein a first total number of the respective multiplicity of regularly-spaced traffic-channel time slots have been allocated for transmission of the particular traffic packet, means for determining that at least a threshold number of the first total number of the respective multiplicity of regularly-spaced traffic-channel time slots allocated for the particular traffic packet remain untransmitted, suspending transmission of the particular traffic packet prior to transmitting any of the remaining, untransmitted traffic-channel time slots of the particular traffic packet, and reallocating up to the threshold number of the remaining, untransmitted traffic-channel time slots of the particular traffic packet for use as control-channel time slots to transmit the particular control packet.

19. The wireless communication system of claim 18, wherein the wireless communication system operates according to a CDMA family of protocols, wherein each of the control packets is an EVDO physical-layer control-data packet, each EVDO physical-layer control-data packet containing a partial, a whole, or more than one EVDO control message, each EVDO control message being one of at least an EVDO control-channel message and an EVDO paging message, and wherein making the determination comprises identifying the particular control packet as being an asynchronous control packet that carries a message, wherein the message is selected from the group consisting of a traffic channel assignment message, and an access probe acknowledgement.

20. The wireless communication system of claim 18, wherein determining that at least the threshold number of the first total number of the respective multiplicity of regularly-spaced traffic-channel time slots allocated for the particular traffic packet remain untransmitted comprises identifying the particular traffic packet as being classified according to a priority level that permits transmission scheduling on a basis of availability of traffic-channel time slots, where availability is determined after other, higher priority packets have been scheduled for transmission.

21. The wireless communication system of claim 18, wherein determining that at least the threshold number of the first total number of the respective multiplicity of regularly-spaced traffic-channel time slots allocated for the particular traffic packet remain untransmitted comprises setting the threshold number to correspond to a particular fraction of the first total number.

22. The wireless communication system of claim 18, wherein suspending transmission of the particular traffic packet prior to transmitting any of remaining, untransmitted traffic-channel time slots of the particular traffic packet comprises canceling transmission of the particular traffic packet prior to transmitting any of remaining, untransmitted traffic-channel time slots of the particular traffic packet.

23. The wireless communication system of claim 18, wherein reallocating up to the threshold number of the remaining, untransmitted traffic-channel time slots of the particular traffic packet for use as control-channel time slots to transmit the particular control packet comprises: allocating a second total number of control-channel times slots for transmission of the particular control packet, wherein the second total number is smaller than the threshold number; and transmitting the particular control packet in its entirety over the course of up to the second total number of control-channel time slots.

24. The wireless communication system of claim 18, wherein reallocating up to the threshold number of the remaining, untransmitted traffic-channel time slots of the particular traffic packet for use as control-channel time slots to transmit the particular control packet comprises: allocating a second total number of control-channel times slots for transmission of the particular control packet, wherein the second total number is at least as large as the threshold number; and transmitting the particular control packet in its entirety over the course of up to the second total number of control-channel time slots.

* * * * *